(12) United States Patent
Xie et al.

(10) Patent No.: US 11,656,377 B2
(45) Date of Patent: May 23, 2023

(54) VISCO-ACOUSTIC FULL WAVEFORM INVERSION OF VELOCITY AND Q

(71) Applicant: CGG SERVICES SAS, Massy (FR)

(72) Inventors: Yi Xie, Singapore (SG); Min Wang, Singapore (SG)

(73) Assignee: CGG SERVICES SAS, Massy (FR)

(*) Notice: Subject to any disclaimer, the term of this patent is extended or adjusted under 35 U.S.C. 154(b) by 689 days.

(21) Appl. No.: 16/032,429

(22) Filed: Jul. 11, 2018

(65) Prior Publication Data

US 2019/0302292 A1  Oct. 3, 2019

Related U.S. Application Data

(60) Provisional application No. 62/650,500, filed on Mar. 30, 2018.

(51) Int. Cl.
*G01V 1/30* (2006.01)
*G01V 1/28* (2006.01)

(52) U.S. Cl.
CPC ............ *G01V 1/301* (2013.01); *G01V 1/282* (2013.01); *G01V 1/303* (2013.01); *G01V 2210/614* (2013.01); *G01V 2210/64* (2013.01); *G01V 2210/679* (2013.01)

(58) Field of Classification Search
CPC ........ G01V 1/301; G01V 1/282; G01V 1/303; G01V 2210/674; G01V 2210/614; G01V 2210/64
See application file for complete search history.

(56) References Cited

U.S. PATENT DOCUMENTS

| | | | |
|---|---|---|---|
| 9,575,194 B2 | 2/2017 | Khalil et al. | |
| 9,702,993 B2* | 7/2017 | Wang | G01V 1/303 |
| 9,772,413 B2* | 9/2017 | Krohn | G01V 1/005 |
| 9,857,489 B2 | 1/2018 | Lambare et al. | |
| 10,670,752 B2* | 6/2020 | Ratcliffe | G01V 1/303 |
| 2011/0075516 A1* | 3/2011 | Xia | G01V 1/303 |
| | | | 367/53 |
| 2012/0073824 A1* | 3/2012 | Routh | G01V 1/28 |
| | | | 166/369 |
| 2012/0073825 A1* | 3/2012 | Routh | G01V 1/28 |
| | | | 166/369 |
| 2012/0143506 A1* | 6/2012 | Routh | G01V 1/282 |
| | | | 702/2 |
| 2014/0350861 A1* | 11/2014 | Wang | G01V 1/303 |
| | | | 702/14 |
| 2016/0282490 A1* | 9/2016 | Qin | G01V 1/282 |
| 2016/0291178 A1 | 10/2016 | Xie et al. | |

(Continued)

OTHER PUBLICATIONS

J. Zhou et al., "FWI-guided Q Tomography for Imaging in the Presence of Complex Gas Clouds", 76th EAGE Conference & Exhibition, Jun. 16-19, 2014, Amsterdam, The Netherlands.

(Continued)

*Primary Examiner* — Manuel A Rivera Vargas
*Assistant Examiner* — Yaritza H Perez Bermudez
(74) *Attorney, Agent, or Firm* — Patent Portfolio Builders PLLC (57) ABSTRACT

A method for seismic exploration uses visco-acoustic FWI to model velocity and quality factor Q for an explored subsurface formation. The method employs frequency-dependent velocity to reduce cross-talk between Q and velocity and may be used for both isotropic and anisotropic media.

15 Claims, 6 Drawing Sheets

(56) References Cited

U.S. PATENT DOCUMENTS

2017/0097428 A1* 4/2017 Sun .................. G01V 1/362
2017/0131418 A1   5/2017 Wang et al.
2018/0017690 A1* 1/2018 Tan .................. G01V 1/303

OTHER PUBLICATIONS

Joe Zhou et al., "Compensating attenuation due to shallow gas through Q tomography and Q-PSDM, a case study in Brazil", SEG San Antonio 2011 Annual Meeting, Sep. 18-23, 2011, pp. 3332-3336.
Joe Zhou et al., "FWI-guided Q tomography and Q-PSDM for imaging in the presence of complex gas clouds, a case study from offshore Malaysia", SEG Houston 2013 Annual Meeting, Sep. 22-27, 2013, Houston, Texas, pp. 4765-4769.
Joe Zhou et al., "FWI-guided Q tomography and Q-PSDM for imaging in the presence of complex gas clouds, a case study from offshore Malaysia", CPS/SEG Beijing 2014 International Geophysical Conference, 2014, pp. 537-540.
Jose M. Carcione et al., "Viscoacoustic wave propagation simulation in the earth", Geophysics, Jun. 1988, pp. 769-777, vol. 53, No. 6.
K. Xin et al., "Adaptive Centroid Frequency Shift Q Tomography", 76th EAGE Conference & Exhibition 2014, Jun. 16-19, 2014, Amsterdam, The Netherlands.
Kefeng Xin et al., "Robust Q tomographic inversion through adaptive extraction of spectral features", SEG Denver 2014 Annual Meeting, Oct. 26-31, 2014, Denver, Colorado, pp. 3726-3730.
Kefeng Xin et al., "Robust seismic reflection Q tomography through adaptive measurement of spectral features", ASEG-PESA 2015, Feb. 15-18, 2015, Perth, Western Australia, pp. 1-4.
Peter Moczo et al., "On the rheological models used for time-domain methods of seismic wave propagation", Geophysical Research Letters, 2005, pp. L01306-L01306, vol. 32.
Y. He et al., "Diving Wave Q Tomography for Compensating Absorption and Dispersion of Shallow Gas Cloud", EAGE Workshop on Velocities, Apr. 25-27, 2016, Kuala Lumpur, Malaysia.
Y.N. Lin et al., "Imaging Through Mega Gas Clouds with FWI and Q TTI RTM", EAGE Workshop on Velocities, Apr. 25-27, 2016, Kuala Lumpur, Malaysia.
Yi He et al., "Tomographic inversion for background Q estimation using adaptively corrected centroid frequency shift", CPS/SEG Beijing 2014 International Geophysical Conference, 2014, pp. 651-655.
Yi Xie et al., "3D prestack depth migration with compensation for frequency dependent absoption and dispersion", ASEG 2010, Aug. 2010, Sydney, Australia, pp. 1-4.
Yi Xie et al., "3D prestack depth migration with compensation for frequency dependent absorption and dispersion", SEG Houston 2009 International Exposition and Annual Meeting, Oct. 25-30, 2009, Houston, Texas, pp. 2919-2923.
Yi Xie et al., "Compensating for visco-acoustic effects in TTI reverse time migration", SEG New Orleans Annual Meeting, Oct. 18-23, 2015, New Orleans, Louisiana, pp. 3996-4001.
R.E. Plessix, "A review of the adjoint-state method for computing the gradient of a functional with geophysical applications", Geophys J. Int., 2006, pp. 495-503, vol. 167.

* cited by examiner

VISCO-ACOUSTIC FULL WAVEFORM INVERSION OF VELOCITY AND Q

CROSS REFERENCE TO RELATED APPLICATIONS

This application claims priority and benefit from U.S. Provisional Patent Application No. 62/650,500 filed on Mar. 30, 2018, for "Method and system for visco-acoustic FWI for inverting Q," the content of which is incorporated in its entirety herein by reference.

BACKGROUND

Technical Field

Embodiments of the subject matter disclosed herein generally relate to methods and systems for seismic exploration, more specifically, to processing seismic data using visco-acoustic full waveform inversion (FWI) to obtain both quality factor (Q) and velocity images of the explored subsurface formation.

Discussion of the Background

Seismic surveys are subject to continuous improvements both in data acquisition and in data processing aspects in order to yield increasingly more reliable insights relative to the geophysical structure of surveyed subsurface formations. The geophysical structure indicates the likely presence and location of hydrocarbon or other minerals, and it is used for planning exploitation of identified natural resources.

Seismic data is acquired by detectors that record sampled amplitudes of seismic signals. The seismic signals are related to seismic excitations generated by seismic sources. A trace is a series of amplitude and time pairs recorded by a detector following a seismic excitation. The seismic excitations are attenuated, reflected, refracted and dispersed while traveling through the surveyed subsurface formation. The seismic excitations may be reflected and refracted at interfaces between layers of the formation characterized by different seismic excitation propagation velocities. The seismic excitations may include components of different frequencies, and the propagation velocity may be different for different frequencies.

The objective of seismic data processing is to obtain structural information regarding the nature and shape of different components of the surveyed subsurface formation. Different components are characterized by different properties, such as propagation velocity and the propagation velocity's dependence on frequency, absorption leading to the seismic excitation's attenuation, etc. The more information extracted by processing the traces, the better the components can be identified and located. While nowadays the term "image" refers to three-dimensional structural information, vertical slices (i.e., two-dimensional images) through the surveyed formation are easier to relate to and are therefore used for illustration.

Some seismic data processing techniques start from a model of one of the parameters throughout the surveyed subsurface formation, and then improve the model by comparing synthetic data generated based on the model with the acquired data. Full waveform inversion (FWI) is one technique that may be employed to generate a high-resolution and high-fidelity velocity model. However, for typical survey data volumes, obtaining an exact FWI solution requires a huge amount of computer resources—if even feasible. Therefore, an approximative FWI solution is usually used to obtain a sufficiently high-resolution and high-fidelity velocity model.

The amplitude and phase of waves pertaining to a seismic excitation are modified while passing through the subsurface formation by various mechanisms, such as geometrical spreading, reflections, transmission, scattering and intrinsic attenuation. Scattering and intrinsic attenuation can be characterized by an overall quality factor (Q). For example, gas trapped in overburdened structures can strongly attenuate seismic waves. The wavelet dispersion and energy attenuation cannot be ignored in an accurate velocity model inversion using full wavefield information. Moreover, inversion of Q helps to provide useful information about rock characteristics, such as saturation.

Radiation patterns of different parameters (such as Q and velocity) revealed by the formation's response as a function of scattering angles has become a popular tool to help understand seismic waves' behavior and interactions inside a surveyed formation. The shape of the radiation pattern for Q is similar to that of velocity. Although simultaneous inversion of Q and velocity may solve the problem, scaling remains challenging.

U.S. Patent Application 2016/0291178 discloses a seismic data processing method compensating for visco-acoustic effects in tilted transverse isotropy reverse time migration. In this method, a Q-tomography is performed first, and then a Q-compensation is based on Q pre-stack depth migration (PSDM). This approach is limited by the Q-tomography, which is based on reflection rather than diving waves.

Although FWI for Q seems to overcome Q-tomography limitations, this direct approach is not solvable due to the cross-talk between velocity and Q. Applying FWI focusing on velocity, and then FWI focusing on Q, yields leakage from velocity to Q.

Therefore, there is a need to develop methods for investigating the structure of a surveyed formation that successfully invert both velocity and the quality factor, Q.

SUMMARY

Various embodiments perform a visco-acoustic FWI to obtain a velocity model and a Q model of the explored subsurface formation, using a frequency-dependent velocity to reduce cross-talk between Q and velocity.

According to an embodiment, there is a method for seismic exploration using a visco-acoustic FWI. The method includes obtaining seismic data for an explored subsurface formation, determining an initial velocity model associated with the explored subsurface formation, performing at least one visco-acoustic FWI to obtain a velocity model and a quality factor, Q, model using a frequency-dependent velocity to reduce cross-talk between Q and velocity, and using a combination of the velocity model and the Q model to identify natural resources in the explored subsurface formation and/or to plan an exploitation thereof.

According to another embodiment, there is a seismic data processing apparatus configured to perform a visco-acoustic FWI. The apparatus has an interface configured to obtain seismic data for an explored subsurface formation, and a central processing unit connected to the interface. The central processing unit is configured to determine an initial velocity model associated with the explored subsurface formation, to perform at least one visco-acoustic FWI to obtain a velocity model and a quality factor, Q, model using a frequency-dependent velocity to reduce cross-talk between Q and velocity, and to use a combination of the velocity model and the Q model to identify natural resources in the explored subsurface formation and/or to plan an exploitation thereof.

According to yet another embodiment, there is a non-transitory computer-readable recording media storing executable codes which when executed by a computer make the computer perform a method for seismic exploration using a visco-acoustic FWI. The method includes obtaining seismic data for an explored subsurface formation, determining an initial velocity model associated with the explored subsurface formation, performing at least one visco-acoustic FWI to obtain a velocity model and a quality factor, Q, model using a frequency-dependent velocity to reduce cross-talk between Q and velocity, and using a combination of the velocity model and the Q model to identify natural resources in the explored subsurface formation and/or to plan an exploitation thereof.

BRIEF DESCRIPTION OF THE DRAWINGS

For a more complete understanding of the present inventive concept, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using the terminology of seismic data acquisition and processing.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Methods and devices according to various embodiments jointly update velocity and Q model using both phase and amplitude differences for the inversion. The high-resolution velocity and Q models are inverted at an early stage in an ongoing velocity model-building that provides uplift in the resulting Q-compensated migrated images which could not be obtained from conventional FWI alone. More advanced imaging methods (least-squares Q-migration) may be used to maximize the benefit of the high-resolution Q model. Note that acoustic FWI refers to an inversion that does not take into consideration absorption and other effects quantified by Q (i.e., 1/Q=0), while visco-acoustic FWI does take into consideration these effects.

A practical approach to inverting Q and updating velocity while taking into consideration absorption-type effects uses the standard linear solid (SLS) model to represent the absorption effects, with the desired constant Q behavior over a given frequency band approximated in a set of parallel SLSs. Based on the relationship between stress and strain, the visco-acoustic wave equation in an isotropic medium is $$s = Lp = \frac{(i\omega)^{2-2\gamma}}{v_0^2}p - \frac{\cos^2\left(\frac{\pi\gamma}{2}\right)}{\omega_0^{2\gamma}}\rho\nabla\cdot\left(\frac{1}{\rho}\nabla p\right) \quad (1)$$

where s is the source term, L is a propagation operator, p is the wavefield at a point in the subsurface, $\rho$ is density, $\gamma=1/(\pi Q)$ is the absorption coefficient, and Q is the quality factor. Further, $\omega_0$ is the reference frequency, and $v_0$ is the velocity field at the reference frequency $\omega_0$. The fractional derivative by the $J^{th}$ order in generalized Maxwell bodies is approximated by $$(i\omega)^{-2\gamma} \approx 1 + \Sigma_{j=1}^J c_j/(i\omega+\omega_j) \quad (2)$$

where $\omega_j$ is relaxation frequency and $c_j$ is the weight factor of the classical Maxwell bodies, which form the generalized Maxwell body, which is a generalized rheological model based on serial and parallel compositions of two of the simplest linear rheological models: the Hooke body (the stress is proportional to the strain) and the Stokes body (the stress is proportional to the strain rate). More details about generalized Maxwell body can be found in the articles "Viscoacoustic was propagation simulation in the earth" by Carcione, et al., published in *Geophysics*, vol. 53, No. (June 1988), pp 769-777, and "On the rheological models used for time-domain methods of seismic wave propagation" by P. Moczo and J. Kristek, published in *Geophysical Research Letters*, Vol. 32, L01306, doi:10.1029/2004GL021598, 2005. Thus, the visco-acoustic wave equations can be reformulated in the time domain as $$\begin{cases} s = \frac{1}{v_0^2}\left(\frac{\partial^2 p}{\partial t^2} + \sum_{j=1}^{J}\frac{\partial^2 e_j}{\partial t^2}\right) - \frac{\cos^2\left(\frac{\pi\gamma}{2}\right)}{\omega_0^{2\gamma}}\rho\nabla\cdot\left(\frac{1}{\rho}\nabla p\right) \\ \omega_j e_j + \frac{\partial e_j}{\partial t} = c_j p \end{cases} \quad (3)$$

where $e_j$ are memory variables. Time marching using equation (3) forward propagates the wavefield in an isotropic visco-acoustic medium in time domain for simulation.

A least-squares-based FWI has been adapted to both honor and invert for Q state. Adjoint method is a numerical method for efficiently computing the gradient of a function in a numerical optimization problem as described in the R. E. Plessix, 2006 article, "A review of the adjoint-state method for computing the gradient of a functional with geophysical applications," published in *Geophysical Journal International*, Vol. 167, Issue 2, pp 495-503. In the adjoint method, the computation of the gradient of the objective function ($\|p-d\|^2$, where p is the predicted wavefields from Earth model m (e.g., velocity model, Q model), d is the recorded wavefields, and $\|\cdot\|$ is a norm (e.g., an L2 norm) requires the computation of $$\left[\frac{\partial L}{\partial m_k} p\right]^T p_b \tag{4}$$

where the right-hand term, $p_b$, is the back-propagated residual wavefield p−d and the left-hand term is constructed from the forward-propagated wavefield p. The variable $m_k$ in the partial derivative represents the parameter to be updated. Hence, a velocity update honoring Q involves $$\frac{\partial L}{\partial v_0} p = -2 \frac{(i\omega)^{2-2\gamma}}{v_0^3} p \tag{5}$$

and a Q update results in $$\frac{\partial L}{\partial \gamma} p = \frac{(i\omega)^{2-2\gamma}}{v_0^2}[-2\ln(i\omega)]p - \frac{\partial}{\partial \gamma}\left[\frac{\cos^2(\frac{\pi\gamma}{2})}{\omega_0^{2\gamma}}\rho\nabla\cdot\left(\frac{1}{\rho}\nabla p\right)\right]. \tag{6}$$

Equations (5) and (6) can be reformulated in time domain by using memory variables for inverting velocity or Q. This approach is a stable manner of processing because the adjoint equation is solved in reverse time.

The Q-FWI formulation in equation (1) is valid for an isotropic medium but can be extended to an anisotropic medium. For example, the following formulation works in the presence of Tilted Transverse Isotropy (TTI):

$$s = L\binom{p}{r} = \frac{(i\omega)^{2-2\gamma}}{v_0^2}\binom{p}{r} - \frac{\cos^2(\frac{\pi\gamma}{2})}{\omega_0^{2\gamma}}\begin{pmatrix}1+2\varepsilon & \sqrt{1+2\delta}\\ \sqrt{1+2\delta} & 1\end{pmatrix}\begin{pmatrix}G_{xx}+G_{yy} & 0\\ 0 & G_{zz}\end{pmatrix}\binom{p}{r} \tag{7}$$

where $\varepsilon$ and $\delta$ are the Thomsen anisotropy parameters, $G_{xx}$, $G_{yy}$ and $G_{zz}$ are rotated differential operators, and r is the auxiliary wavefield (i.e., a wavefield introduced to ease numerical computations). For example, $$G_{xx} = (\rho D_x)^T \left(\frac{1}{\rho} D_x\right),$$

where $(D_x)^T$ is the transposed of the operator $(D_x)$, and $$D_x = \frac{\partial}{\partial x}\cos\varphi\cos\theta + \frac{\partial}{\partial y}\sin\varphi\cos\theta - \frac{\partial}{\partial z}\sin\theta,$$

$$G_{yy} = (\rho D_y)^T\left(\frac{1}{\rho}D_y\right) \text{ where } D_y = \frac{\partial}{\partial x}\sin\varphi + \frac{\partial}{\partial y}\cos\varphi, \text{ and}$$

$$G_{zz} = (\rho D_z)^T\left(\frac{1}{\rho}D_z\right), \text{ where}$$

$$D_z = \frac{\partial}{\partial x}\cos\varphi\sin\theta + \frac{\partial}{\partial y}\sin\varphi\sin\theta + \frac{\partial}{\partial z}\cos\theta,$$

$\theta$ and $\varphi$ being the tilt angle and the azimuthal angle of the TTI symmetry axis, respectively. Similar to the isotropic case, the fractional derivative approximated by the $J^{th}$ order generalized Maxwell bodies, the visco-acoustic TTI wave equations can be reformulated in the time domain as $$\begin{cases} s = \frac{1}{v_0^2}\left[\frac{\partial^2}{\partial t^2}\binom{p}{r} + \sum_{j=1}^{J}\frac{\partial^2}{\partial t^2}\binom{d_j}{e_j}\right] - \\ \frac{\cos^2(\frac{\pi\gamma}{2})}{\omega_0^{2\gamma}}\begin{pmatrix}1+2\varepsilon & \sqrt{1+2\delta}\\ \sqrt{1+2\delta} & 1\end{pmatrix}\begin{pmatrix}G_{xx}+G_{yy} & 0\\ 0 & G_{zz}\end{pmatrix}\binom{p}{r} \\ \omega_j\binom{d_j}{e_j} + \frac{\partial}{\partial t}\binom{d_j}{e_j} = c_j\binom{p}{r} \end{cases} \tag{8}$$

where $d_j$ and $e_j$ are memory variables.

The variable $m_k$ in the partial derivative represents the parameter to be updated. Hence, a velocity update honoring Q in TTI case results in $$\frac{\partial L}{\partial v_0} p = -2\frac{(i\omega)^{2-2\gamma}}{v_0^3}\binom{p}{r} \tag{9}$$

and Q update involves $$\frac{\partial L}{\partial \gamma} p = \frac{(i\omega)^{2-2\gamma}}{v_0^3}[-2\ln(i\omega)]\binom{p}{r} - \frac{\partial}{\partial \gamma}\left[\frac{\cos^2(\frac{\pi\gamma}{2})}{\omega_0^{2\gamma}}\begin{pmatrix}1+2\varepsilon & \sqrt{1+2\delta}\\ \sqrt{1+2\delta} & 1\end{pmatrix}\begin{pmatrix}G_{xx}+G_{yy} & 0\\ 0 & G_{zz}\end{pmatrix}\binom{p}{r}\right]. \tag{10}$$

Similar to equations (5) and (6), equations (9) and (10) can be reformulated in time domain by using memory variables for inverting velocity or Q in the presence of TTI anisotropy.

As already mentioned, the challenge resides in the trade-off between the velocity and quality factor. Inverting for more than one Earth model parameter with FWI is known to be difficult. Worse yet, velocity and quality factor Q have similar radiation patterns, and the Q and velocity components do not vary independently of one another with scattering angles. Although the scaling between velocity and quality factor is challenging, a simultaneous inversion seemed preferable to a sequential inversion to avoid overfitting the data during a mono-parameter inversion. The benefits from multi-parameter joint inversion motivates continuing research to seek better ways to perform this simultaneous inversion of the velocity and the quality factor.

In order to reduce the cross-talk between velocity and quality factor Q, both dispersion and absorption are taken into account. For a given quality factor Q, there is a greater impact of attenuation on seismic amplitudes as the frequency increases. The apparent velocity also varies with frequency due to the phase dispersion of absorption as $$v(\omega) = v_0(\omega_0)\left[1 + \frac{1}{\pi Q}\ln(\omega/\omega_0)\right]. \tag{11}$$

Figure 1:
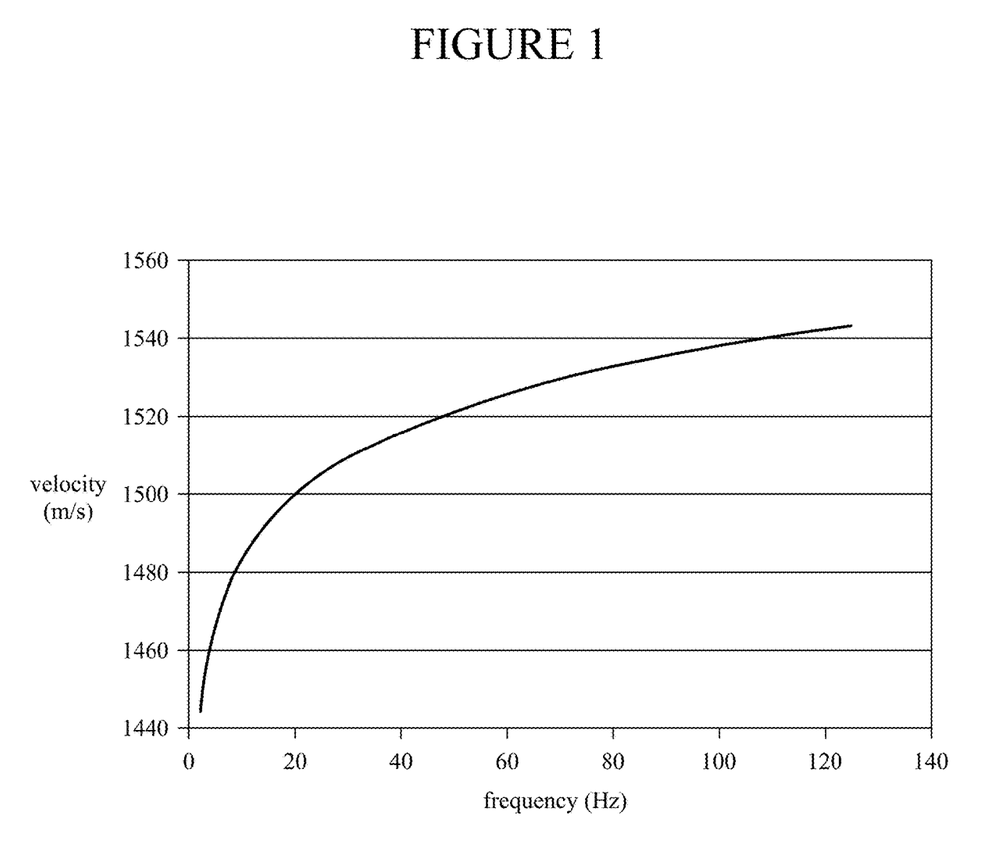
FIG. 1 is a graph exemplarily illustrating frequency-dependent velocity caused by absorption (quantified by Q)

FIG. 1 is a graph exemplarily illustrating a frequency-dependent velocity (reference velocity $v_0$ is 1,500 m/s at frequency $\omega_0=20$ Hz when Q=20). A consequence of frequency-dependent velocity is that the lower frequency content of a seismic excitation has a large time delay relative to the higher frequency content (because the lower frequency velocity is noticeably slower than the velocity at higher reference frequency). Such significant differences enable an iterative Q-FWI to discriminate between velocity and attenuation-like effects and create meaningful updates in both Q and velocity in a broad range of frequencies. This Q-FWI approach yields robust results when performed in the manner illustrated in FIG. 2.

Figure 2:
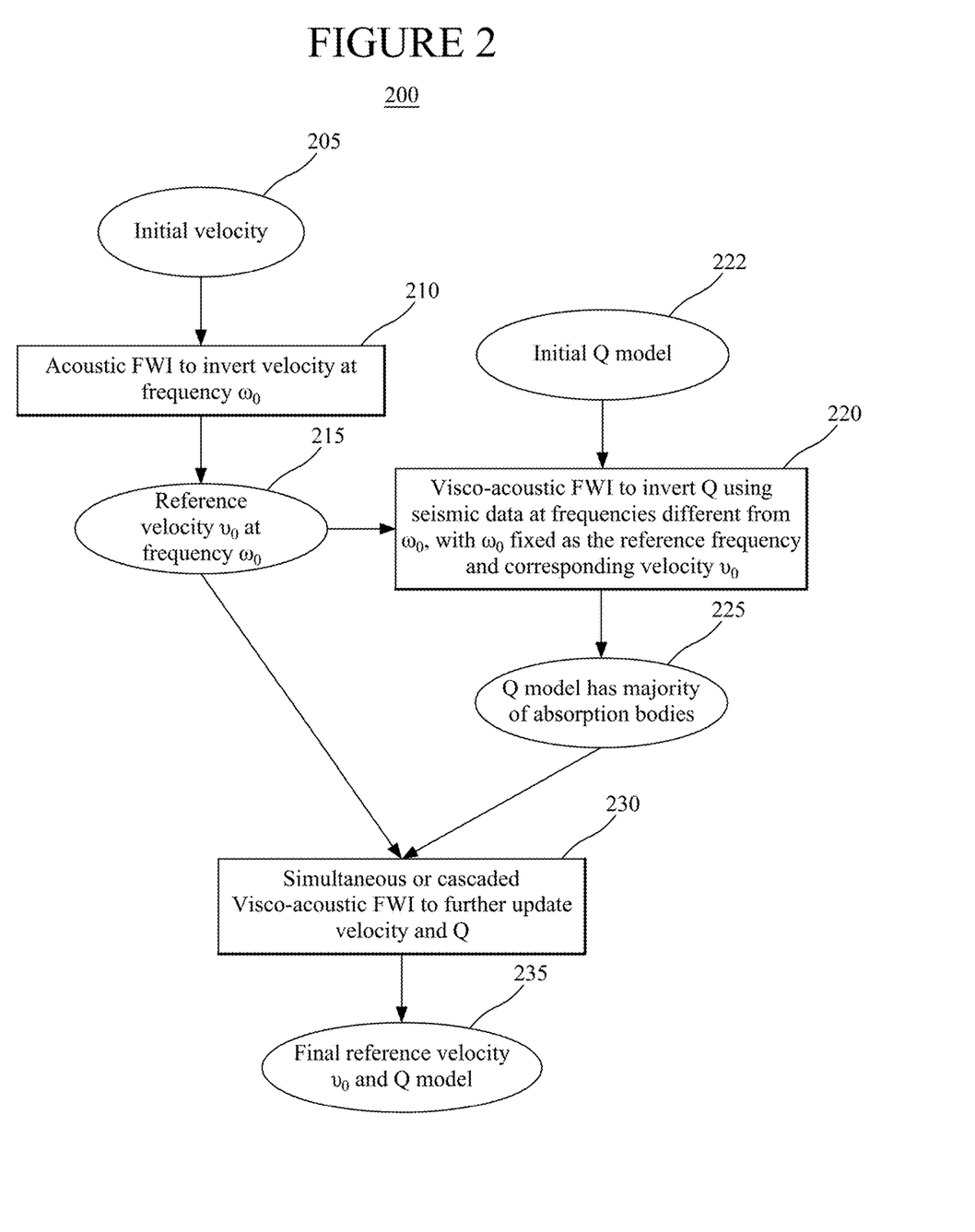
FIG. 2 is a flowchart of a method according to an embodiment.
Figure 3A:
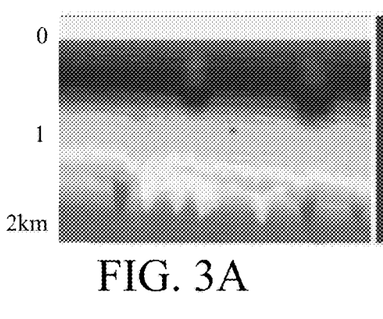
FIGS. 3A to 3I are nine graphs representing vertical slices of velocity, Q models and structural images.
Figure 3B:
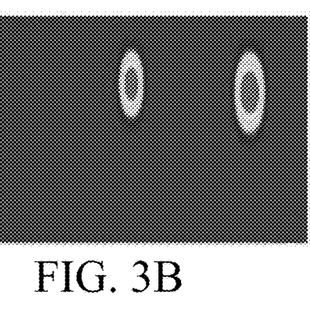
Figure 3C:
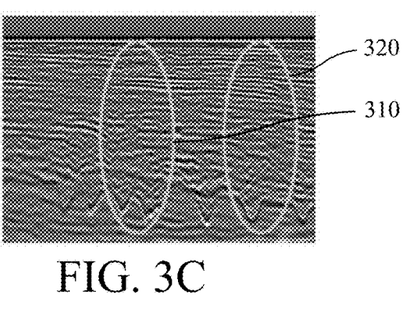

FIG. 2 is a schematic representation of a method 200 according to an embodiment. Method 200's description refers to the nine related graphs in FIGS. 3A-3I. All graphs have, as vertical axis, depth increasing downward, and, as horizontal axis, distance or offset. Thus, the graphs are vertical slices of parameters (velocity, Q models and structural images, in each row), whose values are nuances of gray depending on their magnitude. FIGS. 3A, 3B and 3C are a velocity model, a Q model (valued by 1/Q in this figure) and a reference image generated via a Q-PSDM (pre-stack depth migration) with the velocity and absorption model in 3A and 3B. Absorption anomalies are inserted in the shallow section to simulate the effects of shallow gas pockets.

Method 200 has three stages. In a first stage, at 210, starting from an initial velocity model 205 (as illustrated, for example, in FIG. 3D for the situation in FIG. 3A), an acoustic FWI is iteratively applied from low frequency (about 3.5 Hz) to high frequency (about 12 Hz) using narrow banded seismic data (e.g., 2 Hz width) until the acoustic velocity inversion converges. The output 215 is a converged/reference velocity $v_0$ corresponding to a reference frequency $\omega_0$ (for example, 12 Hz).

This output 215 of the first stage is input to the second stage 220. The second stage may also receive as input an initial Q model 222 as illustrated in FIG. 3E or 1/Q may be considered zero. Since the velocity at frequencies different from the reference frequency (for example, at 3-7 Hz) is not consistent with the initial Q model, there is a phase difference between the observed data and the modeled data at these frequencies. This phase difference is used in this second stage for the Q inversion. At 220, a visco-acoustic inversion is performed using seismic data at frequencies different from the reference frequency to obtain a Q model of the explored subsurface formation. Note that the medium is an acoustic medium (i.e., without absorbing bodies), there is no meaningful update at this stage since the velocity obtained in the first stage satisfies both high- and low-frequency seismic data.

Figure 3D:
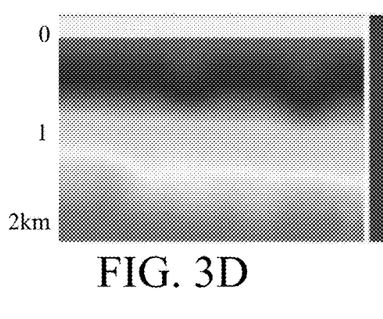
Figure 3E:
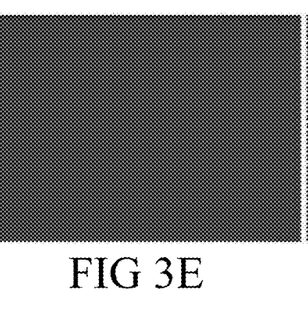
Figure 3F:
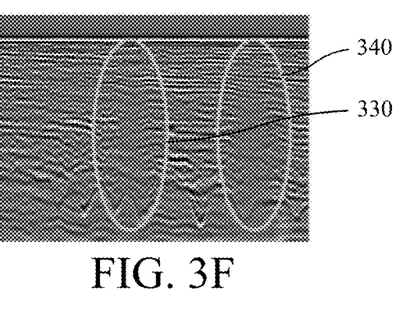

In FIG. 3F obtained through conventional PSDM with the initial velocity (from tomography) in FIG. 3D and initial Q model in FIG. 3E, amplitude dimming and sagging down beneath gas pockets are noticeable in areas 330 and 340 corresponding to areas 310 and 320 of FIG. 3C.

After these two stages, the majority of absorption bodies have been inverted using dispersion in the second stage. Simultaneous or cascaded inversion at 230 further updates velocity and Q. The output of the first and second stages are input to this stage, which then fine-tunes the velocity and Q models.

In an exemplary illustration, acoustic FWI is applied first to invert the velocity using the initial model in FIG. 3D, starting from 3.5 Hz and iterating up to 12 Hz. When velocity inversion is close to convergence, it is set as reference velocity for a 12 Hz reference frequency to invert Q at lower frequencies, such as a frequency band around 3.5 Hz. The phase difference due to dispersion effects between 12 and 3.5 Hz enables identification of most of the anomalous absorption bodies.

The conventional cascaded/sequential velocity and Q inversions invert velocity and Q in the same frequency band, where their effects on phase difference are not easily separated, and therefore fail to decouple. Embodiments described in this section use the difference of apparent velocity over a broad frequency band, which enables decoupling velocity and Q. In one embodiment, a pre-conditioner (such as using a mask guided by low-velocity anomalies) is applied in the Q inversion to accelerate the inversion's convergence.

Figure 3G:
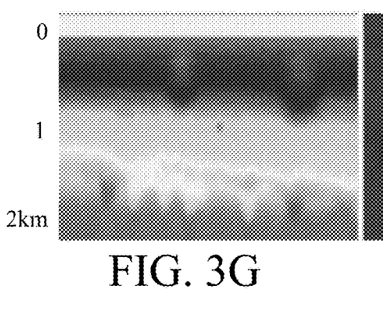
Figure 3H:
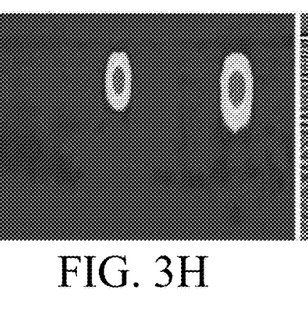
Figure 3I:
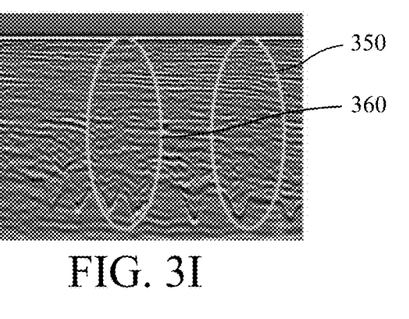

The updated models may then be cascaded by further iterations for joint inversion of velocity and Q up to higher frequency, for example 5.5 Hz. The resulting high-resolution velocity and Q models as shown in FIGS. 3G and 3H successfully capture the slow velocity and absorption anomalies in the shallow, which yields the suitably compensated image (also obtained with Q-PSDM using the updated models 3G and 3H) in FIG. 3I. Areas 350 and 360 in FIG. 3I corresponding to areas 310 and 320 of FIG. 3C no longer exhibit the amplitude dimming and sagging down beneath gas pockets noticeable in areas 330 and 340 of FIG. 3F.

Figure 4A:
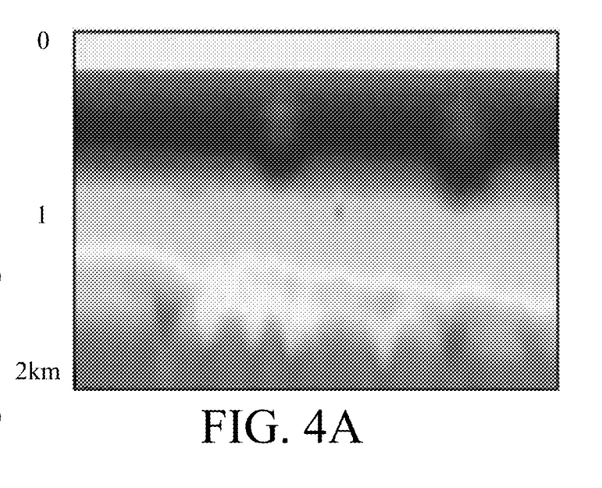
FIGS. 4A to 4D are four graphs representing vertical slices of the inverted velocity models and the difference between the inverted velocity models at two different frequencies, with the top row being inverted from acoustic data, and the bottom row being inverted from visco-acoustic data.
Figure 4B:
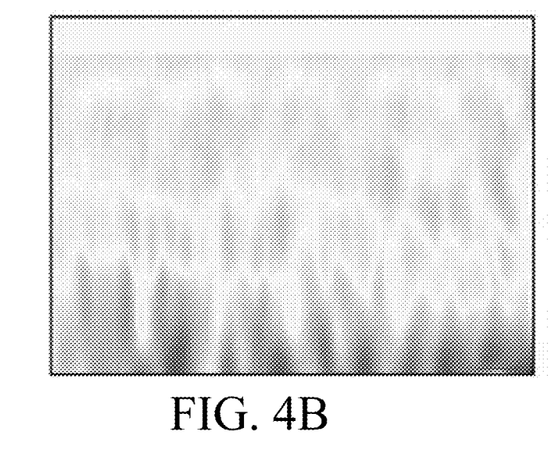

The following two experiments have been performed to further validate this approach. In the first experiment, synthetic acoustic data is generated based on the velocity model in FIG. 3A. Velocity model at 12 Hz shown in FIG. 4A was obtained after applying a first acoustic FWI to have both the high and low wavenumber reasonably converged. Using this velocity as a starting model, a second acoustic FWI inversion has been performed for data in a lower frequency band, around 3.5 Hz. Since the inversion has already reasonably converged, the lower-frequency band inversion does not produce a meaningful update. FIG. 4B shows the difference between velocity in FIG. 4A and the updated velocity output by the second acoustic FWI. Thus, the diving-wave update does not make much difference, as expected, although velocity at shallow depths is complex.

Figure 4C:
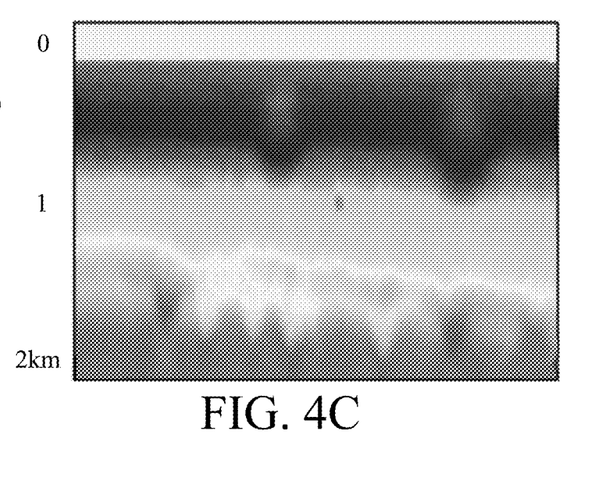
Figure 4D:
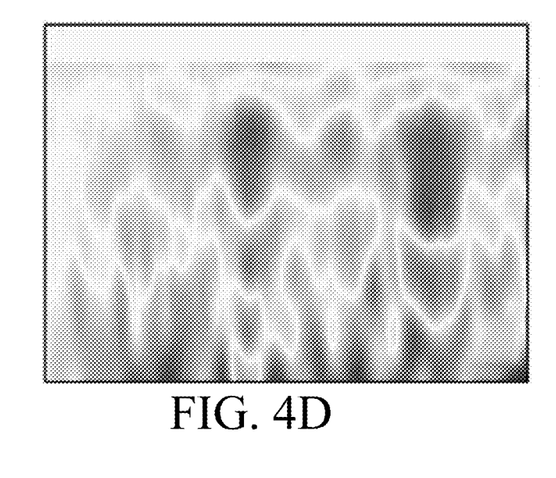

A second experiment uses visco-acoustic data generated with the velocity in FIG. 3A and Q model in FIG. 3B. As in the first experiment, a first acoustic FWI iteration from low-to high-frequency bands yielding the velocity model in FIG. 4C is followed by another acoustic FWI inversion for data at a low-frequency band (around 3.5 Hz). FIG. 4D shows the difference between the velocity model obtained from the inversion at a higher frequency band and the velocity model in FIG. 4C inverted at a lower frequency band. A larger difference is visible in FIG. 4D than the one obtained after the first experiment and illustrated in FIG. 4B.

These experiments demonstrate that acoustic FWI in step 210 converges to velocity at a relatively high frequency band. If without absorption as in the first experiment, this velocity is correct for both low and high wave number, being substantially the same as the velocity obtained for a low-frequency band even after further iterations. However, when absorption is present as in the second experiment, the velocity at low frequency is slower. A Q-FWI inversion may then use the phase difference over the lower frequencies, taking advantage of the velocity difference over different frequency bands to jointly invert for velocity and Q. This approach is different from conventional cascaded velocity and Q estimations, where the inversion of velocity and Q are typically conducted in the same frequency band.

Figure 5:
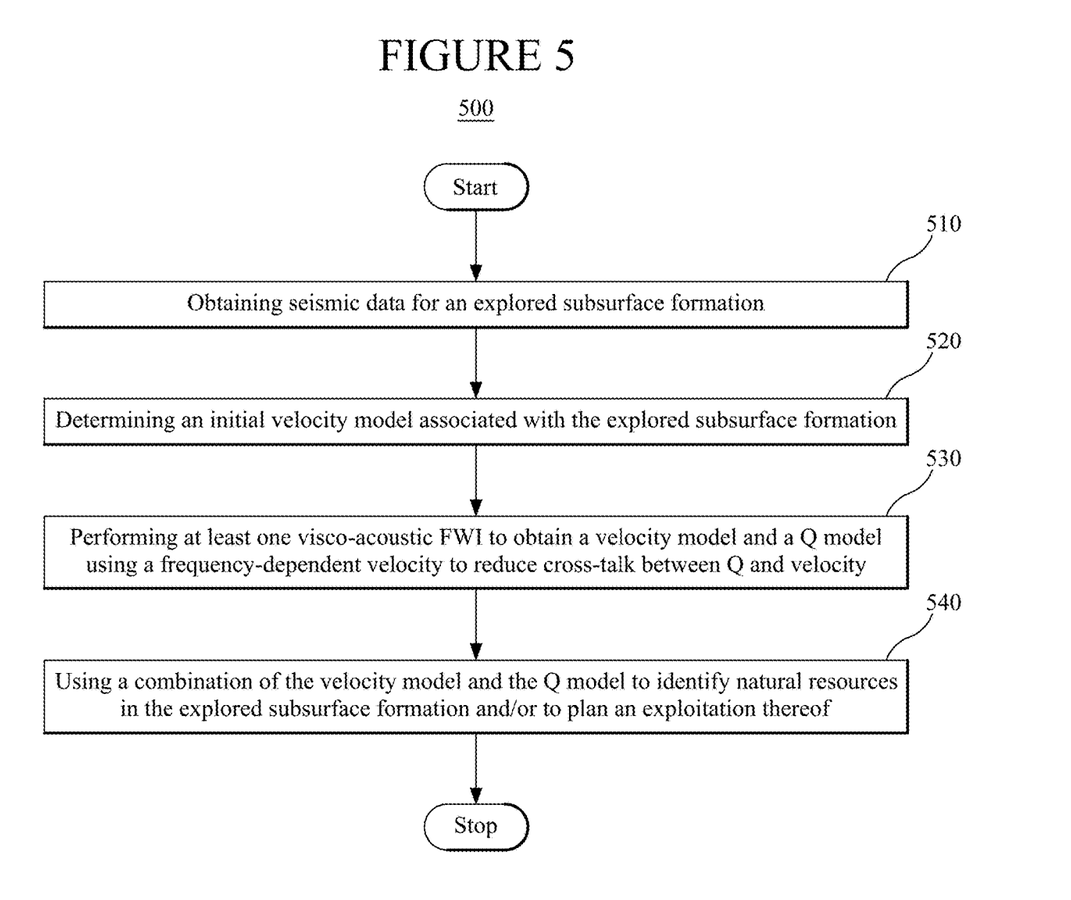
FIG. 5 is a flowchart of a method for seismic exploration using visco-acoustic FWI according to an embodiment.

FIG. 5 illustrates a flowchart of a method 500 according to an embodiment. Method 500 includes obtaining seismic data for an explored subsurface formation at 510. This seismic data may be collected on land or in a marine environment using a seismic source injecting excitations in the explored subsurface formation, and seismic receivers that detect the seismic waves emerging from the explored subsurface formation and generate the seismic data representing the detected waves. In one embodiment, seismic data may be transferred from the data acquisition system.

Method 500 further includes determining an initial velocity model associated with the explored subsurface formation at 520. The initial velocity model may be obtained by performing an acoustic FWI. A reference velocity, which corresponds to a reference frequency, may be established based on the initial velocity model.

Method 500 then includes performing at least one visco-acoustic FWI to obtain a velocity model and a quality factor, Q, model using a frequency-dependent velocity to reduce cross-talk between Q and velocity at 530. The reference velocity may be used as input to the at least one visco-acoustic FWI. The performing may include a first visco-acoustic FWI that inverts Q on a subset of the seismic data in a frequency band different from the reference frequency so as to minimize phase differences (e.g., 220 in FIG. 2). The Q model resulting from this first visco-acoustic FWI and the reference velocity may then be input to a second visco-acoustic FWI (e.g., 230 in FIG. 2) to update velocity and Q models. In case the medium is isotropic, equations (5) and (6) may be used in the visco-acoustic FWI. In case the medium is anisotropic, equations (9) and (10) may be used in the visco-acoustic FWI.

Finally, method 500 includes using a combination of the velocity model and the Q model to identify natural resources in the explored subsurface formation and/or to plan an exploitation thereof at 540. As mentioned in the background section, the more structural information obtained from seismic data, the better to infer the explored subsurface structure and thus identify natural resources therein.

Figure 6:
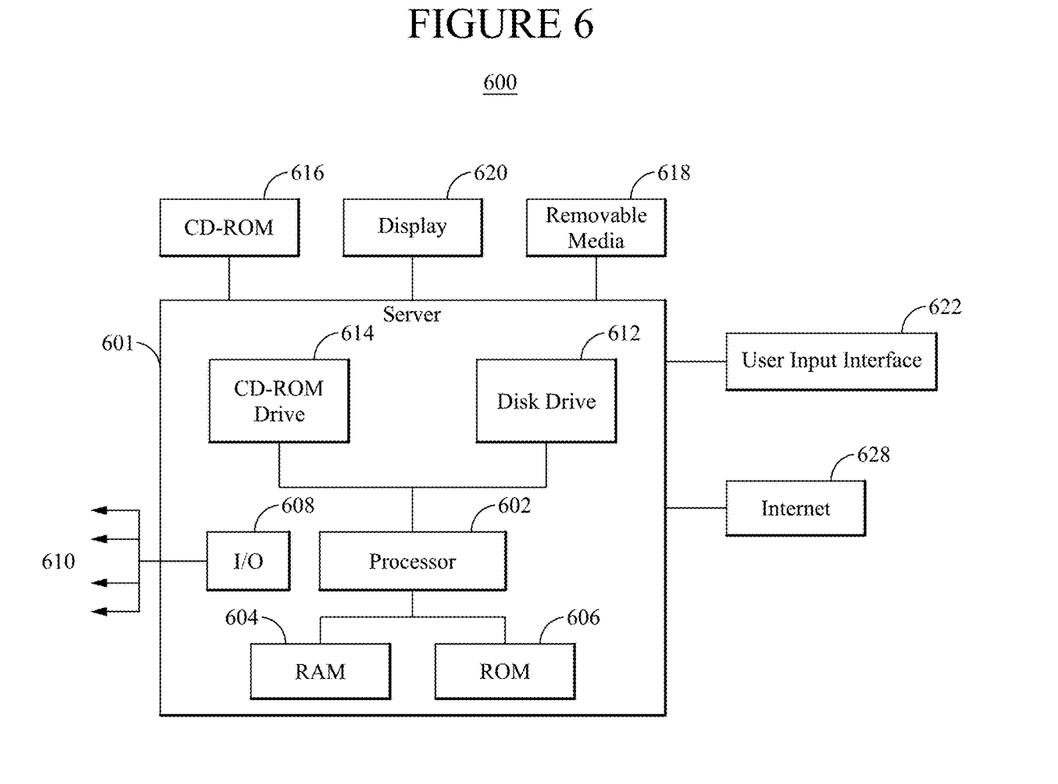
FIG. 6 is a seismic data processing apparatus according to an embodiment.

FIG. 6 illustrates a seismic data processing apparatus 600 configured to execute methods (such as the one in FIG. 2) for visco-acoustic FWI inversion. Apparatus 600 includes a server 601 which has a central processor (CPU) and/or a graphics processor (GPU) 602 coupled to a random-access memory (RAM) 604 and to a read-only memory (ROM) 606. ROM 606 may also be other types of storage media to store programs, such as programmable ROM (PROM), erasable PROM (EPROM), etc. Processor 602 may communicate with other internal and external components through input/output (I/O) circuitry 608 and bussing 610 to provide control signals and the like. Processor 602 carries out a variety of functions as are known in the art, as dictated by software and/or firmware instructions.

RAM 604 is one type of non-transitory computer-readable recording medium that stores executable codes which, when executed by a processor, make the computer perform a method (600) for seismic exploration using a visco-acoustic FWI and using a frequency-dependent velocity to reduce cross-talk between Q and velocity.

Interface 608 is configured to obtain seismic data for an explored subsurface formation. CPU 602 is configured to perform a visco-acoustic FWI inversion using a frequency-dependent velocity to reduce cross-talk between Q and velocity according to embodiments described in this section. CPU 602 may thus be configured to determine an initial velocity model associated with the explored subsurface formation, to perform at least one visco-acoustic FWI to obtain a velocity model and a Q model using a frequency-dependent velocity to reduce cross-talk between Q and velocity, and to use a combination of the velocity model and the Q model to identify natural resources in the explored subsurface formation and/or to plan an exploitation thereof.

CPU 602 may obtain the initial velocity model by performing an acoustic FWI. CPU 602 may also input a reference velocity, which corresponds to a reference frequency and is based on the initial velocity model, to the at least one visco-acoustic FWI.

In some embodiments, CPU 602 may then perform a first visco-acoustic FWI to invert Q on a subset of the seismic data in a frequency band of lower frequencies than the reference frequency so as to minimize phase differences. CPU 602 may also perform a second visco-acoustic FWI to update velocity and Q models using the reference velocity corresponding to the reference frequency and a Q model resulting from the first visco-acoustic FWI as inputs. If the medium is isotropic the visco-acoustic FWI may use equations (5) and (6), while if the medium is anisotropic, the visco-acoustic FWI may use equations (9) and (10).

Server 601 may also include one or more data storage devices, including hard drives 612, CD-ROM drives 614 and other hardware capable of reading and/or storing information, such as DVD, etc. In one embodiment, software for carrying out the above-discussed steps may be stored and distributed on a CD-ROM or DVD 616, a USB storage device 618 or other form of media capable of portably storing information. These storage media may be inserted into, and read by, devices such as CD-ROM drive 614, disk drive 612, etc. Server 601 may be coupled to a display 620, which may be any type of known display or presentation screen, such as LCD, plasma display, cathode ray tube (CRT), etc. A user input interface 622 is provided, including one or more user interface mechanisms such as a mouse, keyboard, microphone, touchpad, touch screen, voice-recognition system, etc.

Server 601 may be coupled to other devices, such as sources, seismic sensors, etc. The server may be part of a larger network configuration as in a global area network (GAN) such as the Internet 628, which allows ultimate connection to various landline and/or mobile computing devices.

The disclosed embodiments provide methods and devices for seismic exploration using a visco-acoustic FWI with a frequency-dependent velocity to reduce cross-talk between Q and velocity. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration using a visco-acoustic full wave inversion, FWI, the method comprising:
    obtaining seismic data for an explored subsurface formation;
    determining an initial velocity model associated with the explored subsurface formation;
    performing a first visco-acoustic FWI to obtain a quality factor, Q, model, using the initial velocity model;
    performing at least one second visco-acoustic FWI to update the velocity model and the Q model using a frequency-dependent velocity to reduce cross-talk between Q and velocity; and
    using a combination of the velocity model and the Q model to identify natural resources in the explored subsurface formation and/or to plan an exploitation thereof,
    wherein a reference velocity, which corresponds to a reference frequency and is based on the initial velocity model, is input to the first and the at least one second visco-acoustic FWI, and
    the first visco-acoustic FWI is performed on a subset of the seismic data in a frequency band different from the reference frequency so as to minimize phase differences.

2. The method of claim 1, wherein the initial velocity model is obtained by performing an acoustic FWI.

3. The method of claim 1, wherein the reference velocity corresponding to the reference frequency and the Q model resulting from the first visco-acoustic FWI are input to the at least one second visco-acoustic FWI to update simultaneously or in cascade the velocity and Q models.

4. The method of claim 1, wherein for an isotropic medium, the at least one second visco-acoustic FWI updates the velocity model based on equation $$\frac{\partial L}{\partial v_0} p = -2 \frac{(i\omega)^{2-2\gamma}}{v_0^3} p$$

and updates the Q model based on equation $$\frac{\partial L}{\partial \gamma} p = \frac{(i\omega)^{2-2\gamma}}{v_0^3}[-2\ln(i\omega)]p - \frac{\partial}{\partial \gamma}\left[\frac{\cos^2(\frac{\pi\gamma}{2})}{\omega_0^{2\gamma}} \rho \nabla \cdot \left(\frac{1}{\rho}\nabla p\right)\right]$$

where L is a propagation operator, p is an wavefield at a point in the explored subsurface formation, ρ is density, $\gamma=1/(\pi Q)$ is an absorption coefficient, Q is the quality factor model, $\omega_0$ is the reference frequency, and $v_0$ is the initial velocity model at the reference frequency $\omega_0$.

5. The method of claim 1, wherein for an anisotropic medium with Tilted Transverse Isotropy, the at least one second visco-acoustic FWI updates the velocity model based on equation $$\frac{\partial L}{\partial v_0} p = -2 \frac{(i\omega)^{2-2\gamma}}{v_0^3}\binom{p}{r}$$

and updates the Q model based on equation $$\frac{\partial L}{\partial \gamma} p = \frac{(i\omega)^{2-2\gamma}}{v_0^3}[-2\ln(i\omega)]\binom{p}{r} - $$

$$\frac{\partial}{\partial \gamma}\left[\frac{\cos^2(\frac{\pi\gamma}{2})}{\omega_0^{2\gamma}}\begin{pmatrix} 1+2\varepsilon & \sqrt{1+2\delta} \\ \sqrt{1+2\delta} & 1 \end{pmatrix}\begin{pmatrix} G_{xx}+G_{yy} & 0 \\ 0 & G_{zz} \end{pmatrix}\binom{p}{r}\right]$$

where L is a propagation operator, p is a wavefield at a point in the explored subsurface formation, ρ is density, $\gamma=1/(\pi Q)$ is an absorption coefficient, $\omega_0$ is the reference frequency, $v_0$ is the initial velocity model at the reference frequency $\omega_0$, ε and δ are Thomsen anisotropy parameters, $G_{xx}$, $G_{yy}$ and $G_{zz}$ are rotated differential operators, θ and φ are a tilt angle and an azimuthal angle of a TTI symmetry axis, respectively, and r is an auxiliary wavefield.

6. A seismic data processing apparatus configured to perform a visco-acoustic full waveform inversion, FWI, the apparatus comprising:
    an interface configured to obtain seismic data for an explored subsurface formation; and
    a central processing unit connected to the interface and configured:
        to determine an initial velocity model associated with the explored subsurface formation;
        to perform a first visco-acoustic FWI to obtain a quality factor, Q, model, using the initial velocity model;
        to perform at least one second visco-acoustic FWI to update the velocity model and the Q model using a frequency-dependent velocity to reduce cross-talk between Q and velocity; and
        to use a combination of the velocity model and the Q model to identify natural resources in the explored subsurface formation and/or to plan an exploitation thereof,
    wherein the central processing unit inputs a reference velocity, which corresponds to a reference frequency and is based on the initial velocity model, to the first and the at least one second visco-acoustic FWI, and
    the central processing unit performs the first visco-acoustic FWI on a subset of the seismic data in a frequency band different from the reference frequency so as to minimize phase differences.

7. The seismic data processing apparatus of claim 6, wherein the central processing unit obtains the initial velocity model by performing an acoustic FWI.

8. The seismic data processing apparatus of claim 6, wherein the central processing unit inputs the reference velocity and the Q model resulting from the first visco-acoustic FWI to the at least one second visco-acoustic FWI to update simultaneously or in cascade the velocity and Q models.

9. The seismic data processing apparatus of claim 6, wherein, for an isotropic medium, the at least one second visco-acoustic FWI updates the velocity model based on equation $$\frac{\partial L}{\partial v_0} p = -2 \frac{(i\omega)^{2-2\gamma}}{v_0^3} p$$

and updates the Q model based on equation $$\frac{\partial L}{\partial \gamma}p = \frac{(i\omega)^{2-2\gamma}}{v_0^3}[-2\ln(i\omega)]p - \frac{\partial}{\partial \gamma}\left[\frac{\cos^2\left(\frac{\pi\gamma}{2}\right)}{\omega_0^{2\gamma}}\rho\nabla\cdot\left(\frac{1}{\rho}\nabla p\right)\right]$$

where L is a propagation operator, p is a wavefield at a point in the explored subsurface formation, $\rho$ is density, $\gamma=1/(\pi Q)$ is an absorption coefficient, Q is the quality factor model, $\omega_0$ is the reference frequency, and $v_0$ is the initial velocity model at the reference frequency $\omega_0$.

10. The seismic data processing apparatus of claim 6, wherein for an anisotropic medium with Tilted Transverse Isotropy, the at least one second visco-acoustic FWI updates the velocity model based on equation $$\frac{\partial L}{\partial v_0}p = -2\frac{(i\omega)^{2-2\gamma}}{v_0^3}\begin{pmatrix}p\\r\end{pmatrix}$$

and updates the Q model based on equation $$\frac{\partial L}{\partial \gamma}p = \frac{(i\omega)^{2-2\gamma}}{v_0^3}[-2\ln(i\omega)]\begin{pmatrix}p\\r\end{pmatrix} -$$
$$\frac{\partial}{\partial \gamma}\left[\frac{\cos^2\left(\frac{\pi\gamma}{2}\right)}{\omega_0^{2\gamma}}\begin{pmatrix}1+2\varepsilon & \sqrt{1+2\delta}\\ \sqrt{1+2\delta} & 1\end{pmatrix}\begin{pmatrix}G_{xx}+G_{yy} & 0\\ 0 & G_{zz}\end{pmatrix}\begin{pmatrix}p\\r\end{pmatrix}\right]$$

where L is a propagation operator, p is a wavefield at a point in the explored subsurface formation, $\rho$ is density, $\gamma=1/(\pi Q)$ is an absorption coefficient, $\omega_0$ is the reference frequency, $v_0$ is the initial velocity model at the reference frequency $\omega_0$, $\varepsilon$ and $\delta$ are Thomsen anisotropy parameters, $G_{xx}$, $G_{yy}$ and $G_{zz}$ are rotated differential operators, $\theta$ and $\varphi$ are a tilt angle and an azimuthal angle of a TTI symmetry axis, respectively, and r is an auxiliary wavefield.

11. A non-transitory computer readable recording medium storing executable codes which, when executed by a processor, make the processor perform a method for seismic exploration using a visco-acoustic full wave inversion, FWI, the method comprising:
obtaining seismic data for an explored subsurface formation;
determining an initial velocity model associated with the explored subsurface formation;
performing a first visco-acoustic FWI to obtain a quality factor, Q, model, using the initial velocity model;
performing at least one second visco-acoustic FWI to update the velocity model and the Q model using a frequency-dependent velocity to reduce cross-talk between Q and velocity; and
using a combination of the velocity model and the Q model to identify natural resources in the explored subsurface formation and/or to plan an exploitation thereof,
wherein a reference velocity corresponding to a reference frequency based on the initial velocity model is used as an input to the first and the at least one second visco-acoustic FWI, and
the first visco-acoustic FWI is performed on a subset of the seismic data in a frequency band different from the reference frequency so as to minimize phase differences.

12. The non-transitory computer readable recording medium of claim 11, wherein
the initial velocity model is obtained by performing an acoustic FWI.

13. The non-transitory computer readable recording medium of claim 11, wherein the reference velocity corresponding to the reference frequency and the Q model resulting from the first visco-acoustic FWI are input to the at least one second visco-acoustic FWI to update simultaneously or in cascade the velocity and the Q models.

14. The non-transitory computer readable recording medium of claim 11, wherein for an isotropic medium, the at least one second visco-acoustic FWI updates the velocity model based on equation $$\frac{\partial L}{\partial v_0}p = -2\frac{(i\omega)^{2-2\gamma}}{v_0^3}p$$

and updates the Q model based on equation $$\frac{\partial L}{\partial \gamma}p = \frac{(i\omega)^{2-2\gamma}}{v_0^3}[-2\ln(i\omega)]p - \frac{\partial}{\partial \gamma}\left[\frac{\cos^2\left(\frac{\pi\gamma}{2}\right)}{\omega_0^{2\gamma}}\rho\nabla\cdot\left(\frac{1}{\rho}\nabla p\right)\right]$$

where L is a propagation operator, p is a wavefield at a point in the explored subsurface formation, $\rho$ is density, $\gamma=1/(\pi Q)$ is an absorption coefficient, Q is the quality factor model, $\omega_0$ is the reference frequency, and $v_0$ is the initial velocity model at the reference frequency $\omega_0$.

15. The non-transitory computer readable recording medium of claim 11, wherein, for an anisotropic medium with Tilted Transverse Isotropy, the at least one second visco-acoustic FWI updates the velocity model based on equation $$\frac{\partial L}{\partial v_0}p = -2\frac{(i\omega)^{2-2\gamma}}{v_0^3}\begin{pmatrix}p\\r\end{pmatrix}$$

and updates the Q model based on equation $$\frac{\partial L}{\partial \gamma}p = \frac{(i\omega)^{2-2\gamma}}{v_0^3}[-2\ln(i\omega)]\begin{pmatrix}p\\r\end{pmatrix} -$$
$$\frac{\partial}{\partial \gamma}\left[\frac{\cos^2\left(\frac{\pi\gamma}{2}\right)}{\omega_0^{2\gamma}}\begin{pmatrix}1+2\varepsilon & \sqrt{1+2\delta}\\ \sqrt{1+2\delta} & 1\end{pmatrix}\begin{pmatrix}G_{xx}+G_{yy} & 0\\ 0 & G_{zz}\end{pmatrix}\begin{pmatrix}p\\r\end{pmatrix}\right]$$

where L is a propagation operator, p is a wavefield at a point in the explored subsurface formation, $\rho$ is density, $\gamma=1/(\pi Q)$ is an absorption coefficient, $\omega_0$ is the reference frequency, $v_0$ is the initial velocity model at the reference frequency $\omega_0$, $\varepsilon$ and $\delta$ are Thomsen anisotropy parameters, $G_{xx}$, $G_{yy}$ and $G_{zz}$ are rotated differential operators, $\theta$ and $\varphi$ are a tilt angle and an azimuthal angle of a TTI symmetry axis, respectively, and r is an auxiliary wavefield.

* * * * *